United States Patent [19]

Wright

[11] 4,393,425
[45] Jul. 12, 1983

[54] LINEAR HEAD ACTUATOR

[75] Inventor: Harold T. Wright, San Carlos, Calif.

[73] Assignee: Disctron, Inc., Milpitas, Calif.

[21] Appl. No.: 248,809

[22] Filed: Mar. 30, 1981

[51] Int. Cl.³ .................. G11B 5/54; G11B 21/24
[52] U.S. Cl. ............................ 360/105; 360/106; 360/109; 360/75
[58] Field of Search ............... 360/106, 104–105, 360/109, 75, 129

[56] References Cited

U.S. PATENT DOCUMENTS

| | | | |
|---|---|---|---|
| 3,849,800 | 11/1974 | Cuzner et al. | 360/97 |
| 3,931,645 | 1/1976 | Dodd et al. | 360/135 |
| 4,003,092 | 1/1977 | Hirata | 360/109 |
| 4,208,685 | 6/1980 | Matla et al. | 360/107 |

FOREIGN PATENT DOCUMENTS 54-153014 12/1979 Japan ........................... 360/106

OTHER PUBLICATIONS

IBM/TDB vol 12, No. 12, May 1970, p. 2273, "High Force Constant Voice Coil Motor . . . ", by Rexford.
IBM/TDB vol. 15, No. 3, Aug. 1972, p. 749, "Balanced Force Voice-Coil Actuator", by Frater.

Primary Examiner—John H. Wolff
Attorney, Agent, or Firm—Spensley, Horn, Jubas & Lubitz

[57] ABSTRACT

An actuator for linearly moving magnetic heads in which an open-ended carriage assembly extends down both sides of the magnet structure in order to provide a much shorter actuator assembly than is typical is described. The loading mechanism is not mounted upon the carriage assembly, thereby allowing the actuator to have a higher resonant frequency than those actuators which carry a more complex structure on the carriage assembly. The magnet structure is in the shape of an E with the motor coil, which is mounted across the open end of the carriage assembly, moving along this center section of the magnet structure. Alignment pins located at the other end of the carriage assembly allow the magnetic head arms to be mounted and aligned quickly and with precision.

6 Claims, 3 Drawing Figures

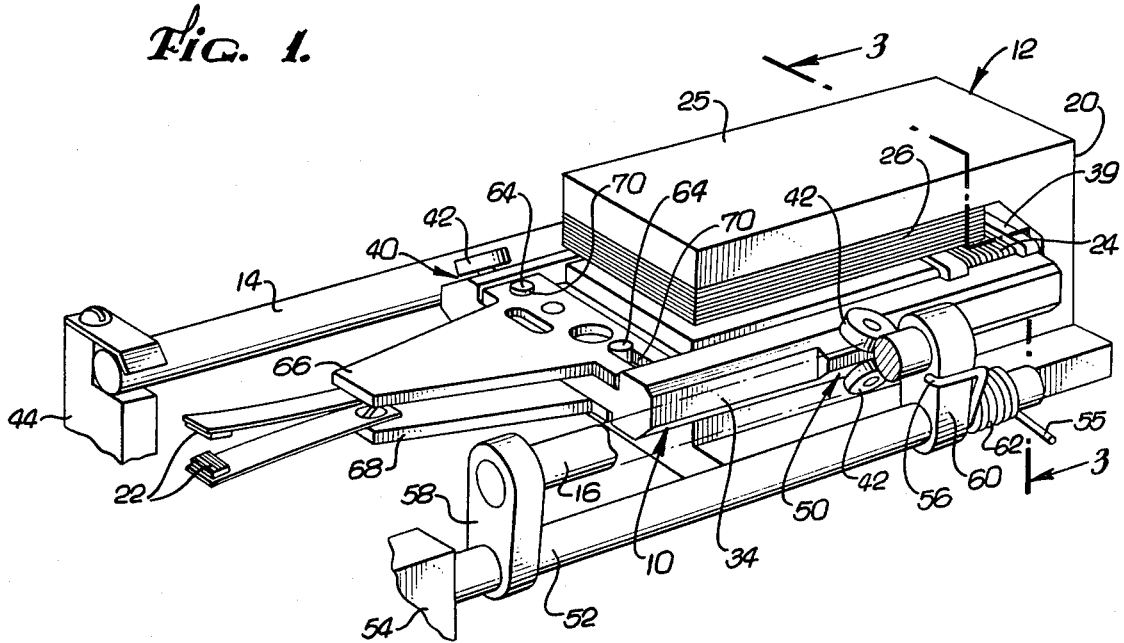

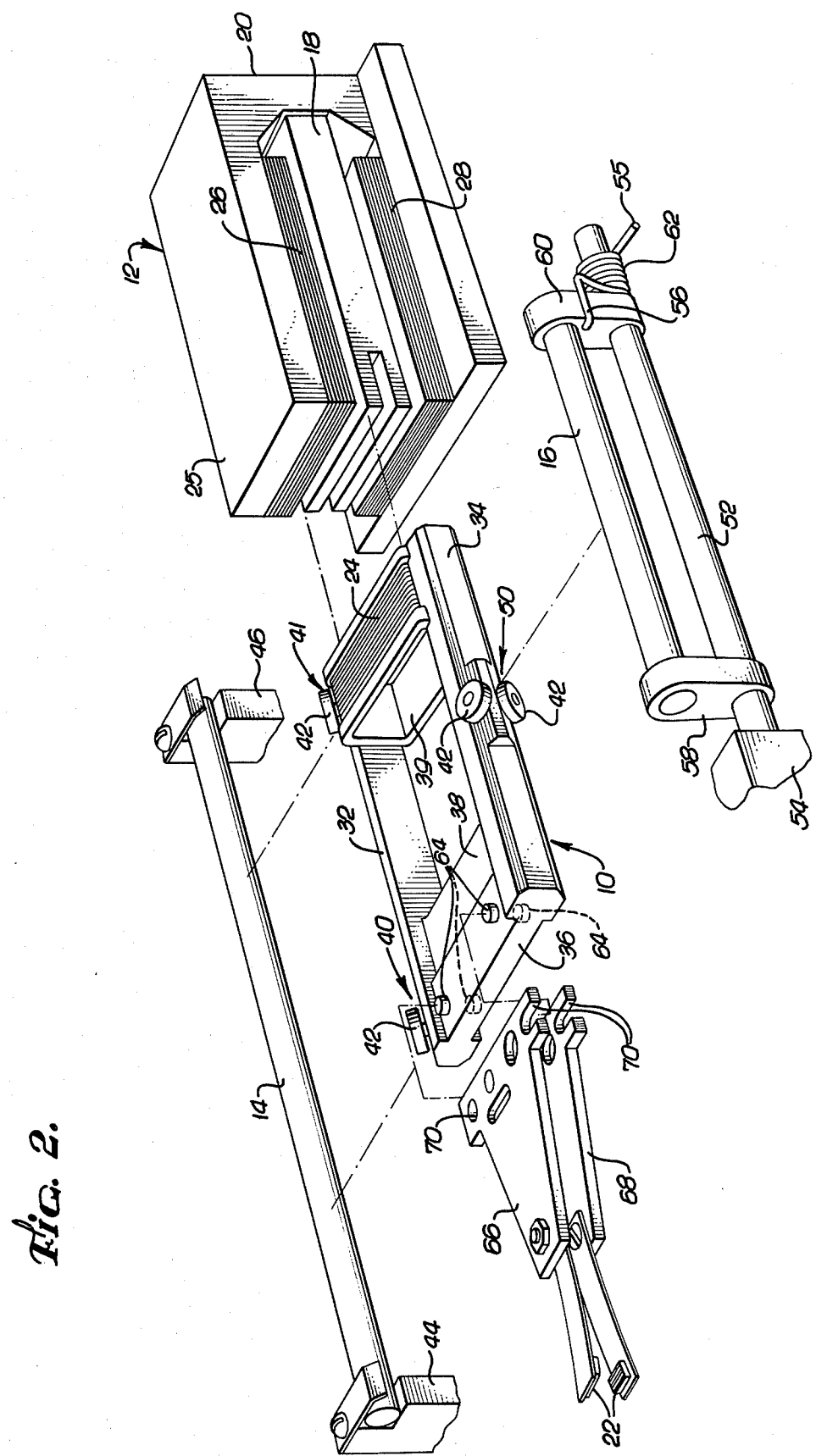

LINEAR HEAD ACTUATOR

BACKGROUND OF THE INVENTION

1. Field of the Invention

The present invention relates to actuators used in disc drive assemblies for linearly moving magnetic heads to different track positions on a magnetic medium.

2. Background of the Invention

Previous designs of linear head actuators use a linear drive motor and a carriage and bearing assembly mounted in series. Because of the series mounting of these components, this configuration requires considerable space in the disc drive assembly.

A different design that has been used mounts the linear drive motor and the carriage and bearing assembly side-by-side. This shortens the overall length, but because of the complex and unsymmetrical structure, significantly lowers the resonant frequency of the carriage assembly, thereby limiting the servo response of the actuator. For medium and high performance disc drives, this limitation has rendered this approach unsatisfactory.

Another shortcoming of some current designs is the use of pivots or mechanisms on the carriage to move a ball bearing on the carriage against a load. The purpose of these preloading pivots or mechanisms is to insure that the carriage always moves along the desired path. Such mechanisms, in which a bearing on the carriage itself is spring-loaded or otherwise adjusted in position, increase the mass as well as the complexity and cost of fabrication of the carriage. These mechanisms, sometimes, have actually resulted in misalignment of the load bearings due to the additional clearances and tolerances involved, and have, in some cases, caused wear on the bearings and guide rods and consequent actuator failure.

Thus, not only do the previous methods and mechanisms used require a large amount of space in order to accommodate them, but other disadvantages including limited servo response due to low resonant frequencies, complexity resulting in increased expense of fabrication and maintenance, and misalignment and wear problems, may also be present.

SUMMARY OF THE INVENTION

The above disadvantages of linear head actuators previously used are all overcome with the use of the present invention. The primary object of the present invention is to provide a simple high performance actuator of small size, and to this end, the present invention, unlike the prior art mechanisms, has bearing support surfaces and travel distances which utilize a maximum of the total actuator length.

In the present invention, a magnet structure which appears when viewed from the side to be in the shape of an E is used. The carriage element is essentially U-shaped and symmetrical with a motor coil located at its open end. The center pole of the E-shaped magnet structure and the opening in the motor coil are sized to allow the motor coil to slip over the center pole of the magnet structure. The motor coil may in fact be slipped over the center pole for almost the entire length of the center pole, the center pole fitting between the sides of the U-shaped carriage element to which the motor coil is attached. Since virtually the entire length of the carriage may be telescoped around the center pole of the magnet, an actuator travel length equal to almost the length of the entire actuator itself is provided. The guide rods, which cooperate with bearings located on the sides of the carriage element, therefore, extend back alongside the magnet area of the actuator. In the fully retracted position, the magnetic heads, mounted on arms, extend just slightly beyond the end of the guide rods, so that they may be loaded upon a rotating magnetic disc situated as near as possible to the actuator. Thus, a new level of compactness in disc drive units is possible using the present invention.

The present invention avoids carrying any pivoting mechanism to preload the bearings against the guide rods on the carriage element itself. Instead, one of the guide rods pivots about a stationary rod and is forced against a bearing located on the corresponding side of the carriage element by a torsional spring. The design of the present invention, therefore, enhances the resonant frequency characteristic of the actuator as well as alleviates cost, alignment and wear, and other problems associated with the more complex structures of the prior art.

DESCRIPTION OF THE DRAWINGS

FIG. 1 is a perspective view of the device of the present invention.

FIG. 2 is an exploded perspective view of the device of the present invention more particularly showing the structure of the various components.

FIG. 3 is a sectional view of the device of the present invention as shown in FIG. 1 taken along the lines 3—3.

DESCRIPTION OF THE PRESENT INVENTION

As can be seen in FIG. 1, the linear actuator of the present invention is constructed so that its moveable carriage element 10 can move into the area alongside the permanent magnet structure 12. The movement of the carriage element 10 along the center pole 18 is guided by the stationary guide rod 14 and the preloaded pivoted guide rod 16. Thus, both the stationary guide rod 14 and the pivoted guide rod 16 for the carriage element 10 are placed partially in the area adjacent to the sides of the permanent magnet structure 12. Virtually the whole length of the linear actuator of the present invention, therefore, is utilized in providing travel distance for the carriage element 10, resulting in a maximum reduction in size for the actuator.

FIG. 1 shows the carriage element 10 in its almost fully contracted position. In this position, the sides of the carriage element 10 telescope around the center pole piece 18 of the permanent magnet structure 12 and the magnetic heads 22 extend just enough beyond the actuator to be loaded onto the outermost track of a magnetic disc. Upon actuation, the carriage element 10 may move outward away from the base 20 of the permanent magnet structure 12, thereby moving the magnetic heads 22 into proximity with other selected tracks on a magnetic disc. The point of furthest travel in this direction corresponds to the motor coil 24 being placed near the end of the center pole piece 18 of the permanent magnet structure 12.

Viewing the permanent magnet structure 12 from the side, it will be seen that it is essentially E-shaped. The magnet frame 25 supports the top pole piece 26 and the bottom pole piece 28 of the permanent magnet structure 12 forming the top, bottom and end of the E, and furnishing a return path for the flux which flows from the top pole piece 26 and the bottom pole piece 28 to the center pole piece 18. The center pole piece 18, part of the magnet frame 25, forms the intermediate part of the E of the permanent magnet structure 12 and extends outward from the base 20 of the permanent magnet structure 12 between the top pole piece 26 and the bottom pole piece 28. The cross-section of the center pole piece 18 is uniform along most of its length, and, as appears in FIG. 3, is essentially rectangular in shape.

It will be understood that the top pole piece 26 and the bottom pole piece 28 could each be a vertically oriented permanent magnet having a north and south pole with the center pole piece 18 and magnet frame 25 providing a flux path. Alternatively, the entire E-shaped structure could be a single magnet with the center pole piece 18 being of one polarity and the top and bottom pole pieces, 26 and 28, respectively being the opposite polarity. Each configuration provides the necessary flux gap and return path.

The carriage element 10 is U-shaped, with the open end of the U facing toward the permanent magnet structure 12. The first side 32 and the second side 34 of the U-shaped carriage element 10 are each a thick stiffened member formed integrally with the base 36. The spacing between the first side 32 and the second side 34 of the U-shaped carriage element 10 is larger than the width of the cross-section of the center pole piece 18 of the permanent magnet structure 12, so that the sides 32 and 34 of the U-shaped channel member 10 may slide along side the outsides of the center pole piece 18, as will be more particularly described. Except for the base 36 and the additional strengthening member 38 adjacent to the base 36, the area between the first side 32 and the second side 34 of the carriage element 10 is left open in order to accommodate the center pole piece 18. It will be noticed that the side members 32 and 34 of the U-shaped carriage element 10 are longer than the length of the center pole piece 10 so that the carriage element 10 may slide almost to the base 20 of the permanent magnet structure 12.

Across the open end of the U-shaped carriage element 10 is placed the motor coil 24. The two ends of the wire wrapped about the coil frame 39 in order to form the motor coil 24 are attached to a source of electrical current not shown in the FIGURES. The frame 39 of motor coil 24 is attached between the first side 32 and the second side 34 of the carriage element 10 near their ends with the frame 39 so attached that the coils of wire wrapped about it are approximately in a plane perpendicular to the side members 32 and 34 of the carriage element 10. The inner opening of the frame 39 has a cross-section slightly larger than the cross-section of the center pole piece 18 of the permanent magnet structure 12 as seen in FIG. 3 so that the motor coil 24 and the carriage element 10 may slide as a unit along the center pole piece 18 of the permanent magnet structure 12.

Energizing the motor coil 24 with current causes the motor coil 24 and hence the carriage element 10 to which it is attached to move along the length of the permanent magnet structure 12 due to the interaction of the field created by the permanent magnet structure 12 and the electromagnetic field due to the current flowing in the motor coil 24.

At the outside edge of the first side 32 of the carriage element 10 are attached two pairs 40 and 41 of rotating bearings 42. One pair is located near each end of the first side 32. Each pair, 40 and 41, of bearings 42 is mounted on exterior edges of the first side 32 which are canted at angles of 45° with respect to the plane defined by the movement of the carriage element 10 along the center pole piece 18. Thus, the angle between the bearing surfaces of the individual bearings 42 in each pair, which are positioned vertically with respect to one another, is 90°.

The surfaces of the bearings 42 of the pairs 40 and 41 ride on the stationary guide rod 14. This rod 14 is fixedly attached to mounts 44 and 46 positioned adjacent to the first side 32 of the U-shaped carriage element 10. Rod 14 has a circular cross-section upon which the surfaces of the bearings 42 of the pairs 40 and 41 may ride as shown in FIG. 3.

The second side 34 of the U-shaped carriage element 10 has one pair 50 of rotating bearings 42 mounted on similarly canted exterior edges. These bearings 42 are positioned approximately in the middle of the carriage element 10 and are also mounted vertically with respect to one another with the angle between the bearing surfaces of the individual bearings 42 being 90°.

The bearing surfaces of the pair 50 of bearings 42 ride on a second or pivoting guide rod 16, which is also circular in cross-section and spring-loaded against the bearing pair 50. The second guide rod is stationary except for the pivoting motion about the parallel fixed rod 52 allowed to rod 16. The pivoting mounts 58 and 60 each have openings sized to accommodate the second guide rod 16 and the parallel fixed rod 52. Bearing surfaces located on the inside of the lower openings in each mount 58 and 60 allow the pivoting mounts 58 and 60, and hence the pivoting guide rod 16, to pivot about the parallel fixed rod 52. Parallel fixed rod 52 is stationary, being attached to mounting blocks, such as mounting block 54.

A torsional coil spring 62 is placed over the parallel fixed rod 52 and encircles it near one end. One end 55 of the torsional coil spring 62 bears against the base of the actuator unit while the other end 56 is fashioned in the form of a broad hook which embraces the pivoting mount 60 in the area between the second guide rod 16 and the parallel fixed rod 52. The force tending to uncoil the torsional coil spring 62 is thus transmitted by the hooked end of the torsional spring 62 to the pivoting mount 60, thereby tending to force the second guide rod 16 against the bearing pair 50. This force loads the first and second guide rods 14 and 16 against the U-shaped carriage element 10 through the bearing pairs 40, 41 and 50 and enables the U-shaped carriage element 10 to travel along the same pre-defined path during each actuation.

The stationary first guide rod 14 and the second guide rod 16 and its associated components which allow it to pivot are positioned so that the U-shaped carriage element 10 can move longitudinally with respect to the center pole piece 18 of the permanent magnet structure 12 without the inside of the coil frame 39 contacting the center pole piece 18 or the outside of the coil frame 39 and the coil itself contacting either of the end pole pieces 26 or 28. It should be noted that the primary alignment of the carriage element 10 is provided by the two bearing pairs 40 and 41 and the stationary first guide rod 14. The spring-loaded second guide rod 16 which provides the force holding the bearing pairs 40 and 41 against the stationary guide rod 14 contacts only the bearing pair 50 on the second side 34 of the U-shaped carriage element 10 and thus is not especially critical from an alignment point of view.

Of special importance in the present invention is the simplicity and symmetry of the carriage element 10.

Thus, the present invention, in avoiding the placement of pivoting and/or spring-loading mechanisms on the carriage, element, raises the resonant frequency of the carriage, thereby enabling faster carriage movement.

At the closed end of the U-shaped carriage element 10, pins 64 oriented vertically with respect to the plane of motion of the carriage element 10 are attached to the base 36 so as to project both above and below the base 36. Holes and/or slots 70 in the head arm assemblies 66 and 68 are positioned to correspond to the location of the pins 64 and are sized to snuggly fit on the pins 64. The head arm assembly 66 is then positioned on those portions of the pins 64 which project from the top of the base 36 and is thereby automatically properly aligned. Head arm assembly 66 may then be securely fastened in the proper position. Similarly, the lower head arm assembly 68 may be positioned on those portions of the pins 64 which project from the bottom of base 36 of the U-shaped carriage element 10 and may then be securely fastened into position. Thus the pins 64 allow the magnetic heads 22 to be properly and quickly aligned with one another. In addition to this automatic alignment feature, this arrangement permits the head arm assemblies to be quickly and easily replaced should that become necessary.

The carriage element 10 carrying the head arm assemblies 66 and 68 to which magnetic transducer heads are attached can move longitudinally with respect to the center pole piece 18 of the permanent magnet structure in response to currents applied to the motor coil 24. In this manner, transducer heads may be moved through the application of the proper electrical signals to the motor coil 24 to any desired tracks on the magnetic medium.

While the present invention has been described in terms of a presently preferred embodiment, it will be appreciated that variations from this presently preferred embodiment are within the scope of the present invention. For example, in the present invention, the motor coil 24 could be constructed with a circular cross-section, in which case center pole piece 18 of the permanent magnet structure 12 would also be circular in cross-section while the end pole pieces 26 and 28 would have arcuate concave surfaces. This variation would permit an increase in the magnetic gap area and thus a corresponding increase in the force with which the carriage element is moved, with the trade off being higher cost for the arcuate magnets and a slight increase in vertical height. As another example, the spring-loading of the second guide rod 16 could be accomplished by the use of other arrangements of components which bear upon the second guide rod 16 or the pivoting mounts 58 or 60 rather than the torsional spring 62 described. It will be appreciated that such other arrangements of components for loading the guide rod against the bearings on the carriage would be within the scope of the present invention. Thus the present invention is not intended to be limited to the above-described preferred embodiment.

I claim:

1. An actuator for translating at least one magnetic head comprising:
    a moveable carriage element carrying said at least one magnetic head having two parallel sides, a closed end and an open end, said carriage element being generally U-shaped and carrying bearing means located along the outside of each of said two parallel sides;
    a stationary first guide rod adjacent and parallel to a first of said two parallel sides of said moveable carriage element cooperating with said bearing means located along said first of said two parallel sides;
    a second guide rod adjacent and parallel to the second of said two parallel sides of said moveable carriage element cooperating with said bearing means located along said second of said two parallel sides, said second guide rod being non-moveable in a direction along its length, said carriage element being moveable linearly on said bearing means along said guide rods;
    biasing means spaced from said moveable carriage for forcing said second guide rod against said bearing means located along said second of two parallel sides;
    an electrical coil mounted across said open end of said moveable carriage element, said coil oriented in a plane generally perpendicular to the parallel sides of the moveable carriage element; and
    a stationary magnet structure positioned between said stationary first guide rod and said second guide rod, said stationary magnet structure having a first member extending within said coil and between said parallel sides of said moveable carriage element, said coil being moveable along almost the entire length of said first member, said stationary magnet structure having at least one other member in addition to said first member extending outside said coil parallel to said first member and connected to said first member at one end, said members defining a magnetic flux path with a magnetic flux gap therebetween in which said coil is located so that when current passes through said coil, magnetic flux crossing said gap will cause said coil to experience a force, said force causing said coil to move along said first member extending within said coil, the direction of movement of said coil depending on the direction of said current in said coil, thereby moving said moveable carriage element along said guide rods.

2. An actuator as in claim 1 further comprising:
    a plurality of pins extending through said closed end of said moveable carriage element, said pins extending upward above said closed end and downward below said closed end, said pins being oriented in a direction perpendicular to the direction of movement of said moveable carriage element;
    a first arm carrying a first of said at least one magnetic head, said arm containing openings sized and located to receive said pins extending above said closed end, said arm being mounted to said closed end, said pins serving as guide pins for mounting said arm; and
    a second arm carrying a second of said at least one magnetic head, said arm containing openings sized and located to receive said pins extending below said closed end, said arm being mounted to said closed end, said pins serving as guide pins for mounting said arm.

3. An actuator as in claim 1 wherein said at least one other member in addition to said first member of said stationary magnet structure comprises two members extending outside said coil on opposite sides of said coil, said two members being parallel to said first member.

4. An actuator as in claim 1 wherein said bearing means located along the outside of said first of two parallel sides are located near each end of said first of two parallel sides of said moveable carriage element and said bearing means located along the outside of said second of two parallel sides are located near the middle of said second of two parallel sides of said moveable carriage element.

5. An actuator as in claim 1 wherein said biasing means comprises:
   a further stationary rod adjacent to and parallel to said second guide rod;
   means mounted on said further stationary rod for holding said second guide rod and for allowing said second guide rod to pivot about said further stationary rod, said second guide rod remaining parallel to said further stationary rod; and
   means for forcing said second guide rod against said bearing means located along said second of said two parallel sides of said moveable carriage element.

6. An actuator as in claim 5 wherein said means for forcing said second guide rod against said bearing means located along said second of two parallel sides of said carriage element is a torsional spring mounted around said further stationary rod having an arm for pushing said means for holding said second guide rod.

* * * * *